United States Patent Office 3,291,691
Patented Dec. 13, 1966

3,291,691
COMPOSITION AND METHOD FOR THE TREATMENT OF CYANIDE POISONING
Michel Marie Rolland, 6 Rue Benouville, Paris, France
No Drawing. Filed May 25, 1965, Ser. No. 458,754
Claims priority, application France, Mar. 24, 1961, 856,847, Patent 1,377
6 Claims. (Cl. 167—65)

This application is a continuation-in-part of copending application Serial No. 180,864, filed March 19, 1962, now abandoned.

This invention relates to a composition for and method of treating cyanide poisoning.

The toxicity of cyanides is at present attributed to the fact that they inhibit cytochrome oxydase, the respiratory enzyme, whose activity, owing to the iron content of its molecule, is indispensable for the life of all aerobic cells.

The $C \equiv N^-$ ions form an iron complex and so destroy almost all possible cellular oxidative activity. To reestablish the activity of the enzymes, it is necessary to extract them from the complex they form with cytochrome oxydase and introduce them into some other combination which would then allow their elimination.

The administration of certain cobalt complexes, or the presence of methaemoglobin in the organism, allows this object to be attained. In the treatment of cyanide poisoning it has been tried up to now to prepare methaemoglobin in vivo by means of agents such as nitrites, methylene blue, para-aminothiophenone, etc.

These agents, however, possess pernicious secondary pharmacological effects which limit their use, either because they themselves are not free of toxicity or because they destroy an important part of the respiratory pigment under circumstances where its whole activity would be required.

Hydroxocobalamin, a natural product obtained from cyanocobalamin through substitution of the cyano group by a hydroxy group, does not itself interfere in the respiratory process and is therefore free from such disadvantages and is to be preferred. In fact, the absence of a cyanide group from its molecule lends hydroxocobalamin additive characteristics for cyanides. By means of formation of cyanocobalamin, it is capable of fixing and even removing cyanides from their combinations if the bonds formed in vivo are less stable than those joining them to cobalamin in cyanocobalamin.

Sodium thiosulphate is also a well-known product, which is a white salt of the formula $Na_2S_2O_3$ but which is considered as having no pharmacological effects in the treatment of cyanide poisoning.

This invention is the discovery that the composition constituted by a combination of the two compounds hydroxocobalamin and sodium thiosulphate is much more active than hydroxocobalamin alone in the treatment of cyanic poisoning and that said combination produces synergy.

Accordingly this invention has for its object the composition for and method of treatment of cyanide poisoning constituted by a combination of the two compounds hydroxocobalamin and sodium thiosulphate.

The new composition is advantageously administered parenterally and preferably intraveneously, in proportions of 100 parts by weight hydroxocobalamin to about 35 to 80 parts by weight of sodium thiosulphate, preferably 100 parts by weight of hydroxocobalamin to about 300 to 800 parts by weight of sodium thiosulphate, and more preferably 100 parts by weight of hydroxocobalamin to about 500 to 800 parts by weight of sodium thiosulphate.

Examples of the ingredients for the new composition are given in the table hereunder:

|  | Example 1 | Example 2 |
| --- | --- | --- |
| Hydroxocobalamin | 150 mgr | 2 gr. |
| Sodium thiosulphate | 1 gr | 10 gr. |
| Sodium neutral sulphite | 0.04 gr | 0.40 gr. |
| Distilled water q.s.p. | 10 ml | 100 ml. |

The following additional examples are intended to prove the existence of an antitoxic synergy produced by the combination of hydroxocobalamin and sodium thiosulphate.

(3) A continuous profusion of a neutral solution of hydrocyanic acid in physiological serum causes the death of a test animal (dog or rabbit) within a period of time varying only within very narrow limits: 12 to 14 minutes for a flow of 0.1 mg. of $C \equiv N^-$ per kg. animal per minute.

(4) If the perfusion is stopped about the sixth minute, at the moment when the primary apnea is produced, the animal only dies by approximately the twentieth minute.

(5) An animal so treated, which after this period of perfusion receives an injection of 50 mg./kg. hydroxocobalamin, shows very active renewal of respiratory movements, although perfusion is continued, and only dies after at least 20 minutes of perfusion.

(6) If under the same conditions, the animal is given sodium thiosulphate instead of hydroxocobalamin, the course of intoxication is not changed at all. The curing effect of thiosulphate is nil.

(7) If the administration of hydroxocobalamin occurs simultaneously with the stopping of the perfusion, the animal survives with certainty in 90% of the cases.

(8) Finally, if after six minutes of perfusion the animal is given a combination consisting for example of 0.4 g./kg. of sodium thiosulphate and 50 mg./kg. of hydroxocobalamin, the physiology of the animal does not only rapidly revert to normal in all cases, but it becomes necessary to continue the perfusion of poison for at least two hours, and sometimes for more than four hours, for the reappearance of the poison syndrome, which the administration of the drug has suppressed, to be observed. Furthermore a new treatment prolongs the resistance of the animal against the toxic action of hydrocyanic acid.

There follow additional examples of the instant poisoning of animals by direct introduction of hydrocyanic acid into the blood stream. The following Examples Nos. 9–26 relate to female guinea pigs of a weight of 400 to 500 grams, anaesthetized with urethane. In the jugular vein of each, cannulae are introduced by which the animal receives a titrated solution of potassium cyanide in physiological serum, the solution being adjusted to near pH 7 with hydrochloric acid.

The animals so poisoned show the usual symptoms of cyanide poisoning: increase and then decrease of pulmonary ventilation and a prolonged apnea followed by a period during which the respiratory motions are of large magnitude, and then definitive apnea and heart stoppage.

In the following examples, "live delay" means the time between the time the injection is started and the time the heart stops.

In general, the average live delay with various perfusions of cyanide ion on test animals is such that at a rate of 0.1 mg. of CN ion/kg. of body weight per minute, the average live delay is about 24 minutes; with 0.2 mg. of CN ion/kg. of body weight/minute, it is around 13 minutes; while with a perfusion of 0.3 mg. of CN ion/kg. body weight/minute, it is around 10 minutes.

In the following examples, the rate of perfusion remains constant at 0.2 mg. of CN ion/kg. of body weight/minute, and continues until death. Each example corresponds to average results for six test animals.

The first group of examples, Nos. 9–13, relate to the effect of hydroxocobalamin alone. In each example, the indicated quantity of hydroxocobalamin is injected when the primary apnea first appears following perfusion with the indicated quantity of cyanide. In Example 9, no hydroxocobalamin is administered, whereupon the average live delay is 13.6 minutes. In Example 10, 65 mg. of hydroxocobalamin/kg. of body weight are administered upon the onset of primary apnea, whereupon the average live delay is prolonged to 18.16 minutes. Progressively larger quantities of hydroxocobalamin are administered in the same way in Examples 11, 12 and 13, whereupon the average live delay is seen to be extended. The results for Examples 9–13 are tabulated in the following table:

| Example No. | 9 | 10 | 11 | 12 | 13 |
| --- | --- | --- | --- | --- | --- |
| Hydroxocobalamin (mg./kg.) | 0 | 65 | 130 | 260 | 520 |
| Average Live Delay (minutes) | 13.6 | 18.16 | 21.75 | 30.9 | 42.25 |

Another set of examples deals with the effect upon the average live delay, under the same conditions as for Examples 9–13, of the administration of sodium thiosulphate alone, that is, with no administration of hydroxocobalamin. Examples 14–19 show that the average live delay following the administration of sodium thiosulphate is of the same order of magnitude, with immaterial variations, as the average live delay with no administration of sodium thiosulphate. In other words, Examples 14–19 show live delays of the same order of magnitude as Example 9.

| Example No. | 14 | 15 | 16 | 17 | 18 | 19 |
| --- | --- | --- | --- | --- | --- | --- |
| Sodium Thiosulphate (mg./kg.) | 50 | 100 | 200 | 400 | 650 | 1,040 |
| Average Live Delay (minutes) | 13.2 | 13.7 | 13.0 | 12.1 | 13.2 | 12.8 |

Sodium thiosulphate alone, previously known as a preventative for cyanide poisoning, is thus demonstrated to be useless once the important symptoms of cyanide poisoning are apparent.

The synergy of hydroxocobalamin and sodium thiosulphate, according to the present invention, is demonstrated by the next group of Examples 20–26. In each of these, 130 mg./kg. of body weight of hydroxocobalamin are administered, in combination with various quantities of sodium thiosulphate. Example 20 shows the effect of administration of 130 mg./kg. of body weight of hydroxocobalamin alone, and as expected, is of the same order of magnitude as Example 11. The succeeding examples show the effect of the administration, conjointly with 130 mg. of hydroxocobalamin per kg. of body weight, of progressively increasing quantities of sodium thiosulphate. As will be noted, even the use of relatively small quantities of sodium thiosulphate renders 130 mg./kg. of hydroxocobalamin as effective or more effective than much greater quantities of hydroxocobalamin alone. The extremely high cost of hydroxocobalamin must be borne in mind in assessing these results. Examples 20–26 are set forth in tabular form below.

| Example No. | 20 | 21 | 22 | 23 | 24 | 25 | 26 |
| --- | --- | --- | --- | --- | --- | --- | --- |
| Sodium Thiosulphate (mg./kg.) | 0 | 50 | 100 | 200 | 400 | 650 | 1,040 |
| Average Live Delay (minutes) | 21.3 | 33.6 | 50.2 | 82.1 | 125 | 130 | 129 |

The superiority of the medication in accordance with the present invention and the synergy resulting from the combination of the two substances have been shown by the examples just described.

Having described my invention, I claim:

1. A composition for the treatment of cyanide poisoning, consisting essentially of 100 parts by weight of hydroxocobalamin and about 35 to 800 parts by weight of sodium thiosulphate.

2. A composition for the treatment of cyanide poisoning, consisting essentially of 100 parts by weight of hydroxocobalamin and about 300 to 800 parts by weight of sodium thiosulphate.

3. A composition of the treatment of cyanide poisoning, consisting essentially of 100 parts by weight of hydroxocobalamin and about 500 to 800 parts by weight of sodium thiosulphate.

4. A method of treating cyanide poisoning in mammals, comprising administering to mammals by injection 100 parts by weight of hydroxocobalamin and about 35 to 800 parts by weight of sodium thiosulphate conjointly in an aqueous medium.

5. A method of treating cyanide poisoning in mammals, comprising administering to mammals by injection 100 parts by weight of hydroxocobalamin and about 300 to 800 parts by weight of sodium thiosulphate conjointly in an aqueous medium.

6. A method of treating cyanide poisoning in mammals, comprising administering to mammals by injection 100 parts by weight of hydroxocobalamin and about 500 to 800 parts by weight of sodium thiosulphate conjointly in an aqueous medium.

References Cited by the Examiner

Chen et al.: Journal of the American Medical Association, vol. 149, pages 113–119.

Delga et al.: Compt. Rend. Soc. Biol., volume 155, pages 1016–1019, May 13, 1961.

Loy et al.: Journal of the Association of Official Agricultural Chemist, vol. 35, No. 1, February 1952, pages 169–174.

Mushett et al.: Proc. Soc. Exp. Biol. and Med., vol. 81, No. 1, pages 234–237, October 1952.

LEWIS GOTTS, *Primary Examiner.*

RICHARD L. HUFF, *Assistant Examiner.*